United States Patent [19]
Shimada et al.

[11] Patent Number: 5,640,939
[45] Date of Patent: Jun. 24, 1997

[54] ENGINE CONTROL APPARATUS

[75] Inventors: Kousaku Shimada; Naoyuki Ozaki, both of Hitachinaka, Japan

[73] Assignee: Hitachi, Ltd., Japan

[21] Appl. No.: 544,647

[22] Filed: Oct. 18, 1995

[30] Foreign Application Priority Data

Oct. 18, 1994 [JP] Japan .................. 6-251855

[51] Int. Cl.⁶ .................................. F02P 5/15
[52] U.S. Cl. .......................... 123/417; 123/406
[58] Field of Search .................. 123/406, 416, 123/417

[56] References Cited

U.S. PATENT DOCUMENTS

| | | | |
|---|---|---|---|
| 4,592,315 | 6/1986 | Kobayashi et al. | 123/672 |
| 5,148,791 | 9/1992 | Nagano et al. | 123/417 |
| 5,383,432 | 1/1995 | Cullen et al. | 123/406 |
| 5,448,975 | 9/1995 | Sato | 123/406 X |

FOREIGN PATENT DOCUMENTS

| | | |
|---|---|---|
| 33 09 947 | 7/1984 | Germany . |
| 33 44 584 | 6/1985 | Germany . |
| 5-71381 | 3/1993 | Japan . |

*Primary Examiner*—Tony M. Argenbright
*Attorney, Agent, or Firm*—Evenson, McKeown, Edwards & Lenahan, P.L.L.C.

[57] ABSTRACT

An engine control apparatus in which an air/fuel ratio for the engine is controlled between the stoichiometric point and a lean point. The engine control apparatus is constructed so as to detect a predetermined period of the transient time in which the air/fuel ratio is switched from the stoichiometric point to the lean point or from the lean point to the stoichiometric point, and delay an ignition timing during the predetermined period of transient time.

16 Claims, 9 Drawing Sheets

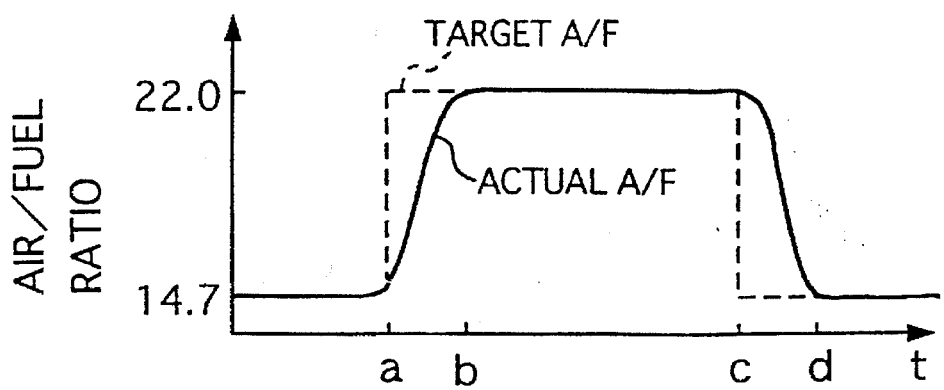
Fig. 6A
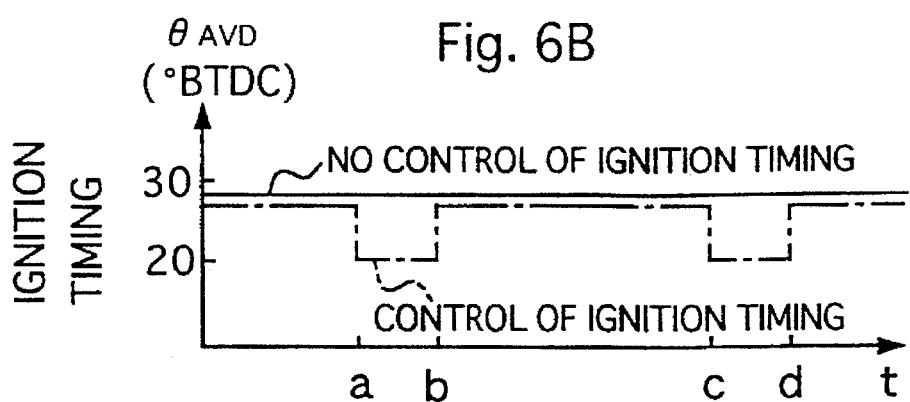
Fig. 6B
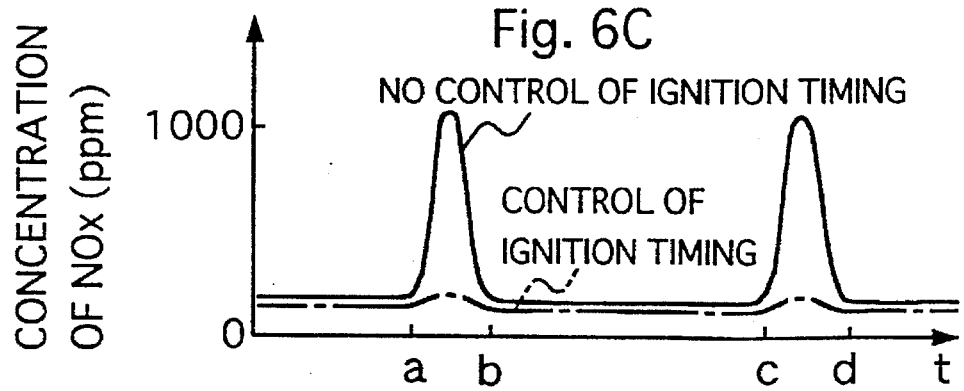
Fig. 6C
Fig. 7
TABLE OF DELAY AMOUNT
| ENGIN SPEED Ne(rpm) | 400 | 800 | 1200 | ...... | 7600 | 8000 |
|---|---|---|---|---|---|---|
| DELAY AMOUNT Δθ (deg) | 5 | 7 | 8 | ...... | 6 | 5 |

Fig. 8
MAP OF DELAY AMOUNT
| ENGINE SPEED Ne(rpm) / THROTTLE OPENING Th(deg) | 400 | 800 | 1200 | ......... | 7600 | 8000 |
|---|---|---|---|---|---|---|
| 0 | 0 | 0 | 4 | | 13 | 15 |
| 5 | 5 | 7 | 7 | | 15 | 15 |
| ⋮ | | | | | | ⋮ |
| 80 | 2 | 3 | 3 | | 2 | 2 |
| 85 | 2 | 2 | 2 | ......... | 2 | 2 |
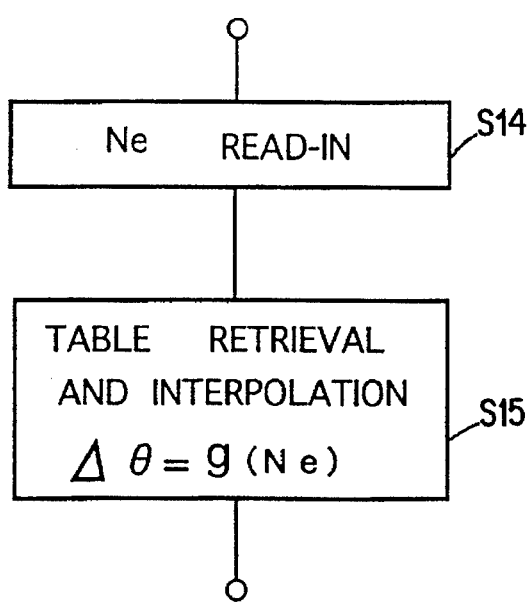
Fig. 9
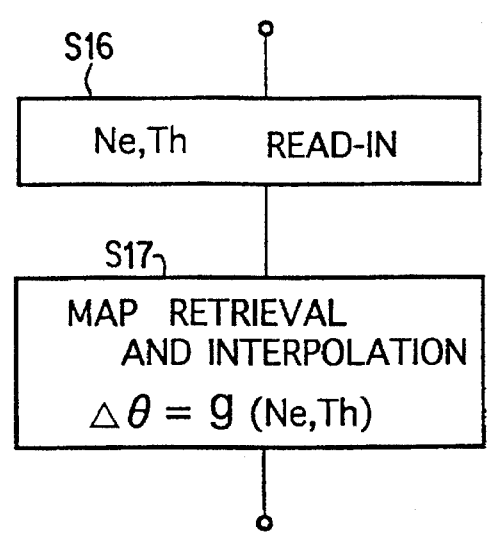
Fig. 10

ENGINE CONTROL APPARATUS

BACKGROUND OF THE INVENTION

1. Field of the Invention

The present invention relates to an engine control apparatus, more particularly to an engine control apparatus for controlling the ignition timing in a lean-burn engine in which an air/fuel ratio is switched between the stoichiometric point and a lean point.

2. Description of the Prior Art

The conventional lean-burn engine is controlled such that the fuel is burned at a lean air/fuel ratio (ex. 20 to 25) far higher than the stoichiometric point (14.7) at a low engine speed or a light load condition, thereby improving the fuel consumption. While, the engine is controlled such that the fuel is burned at the stoichiometric air/fuel ratio under acceleration or heavy load. As a result, it is possible to improve the fuel consumption while maintaining the output torque.

If the predetermined air/fuel ratio is varied substantially when the lean air/fuel ratio and the stoichiometric air/fuel ratio is switched on the basis of the change in operation of the above-mentioned engine, a large torque difference is occured when the predetermined air/fuel ratio is switched, because the produced torques are different to each other even if the operating condition is the same. Therefore, in order to prevent the deterioration of drivability, the air/fuel ratio is not switched at a time, but it is varied in stages every air-intake stroke of cylinders and finally switched completely. The above lean-burn engine is disclosed in, for example, Japanese Patent Application Laid-Open No. 5-71381 (1993).

Now, in the above conventional control system of the air/fuel ratio for an engine, it is required to obtain the target air/fuel ratio through the medium air/fuel ratio (A/F=16 to 18) when switched between the stoichiometric point (A/F= 14.7) and a lean point (A/F=16 to 18).

However, as described below, it is proved that the concentration of NOx in the exhaust gas at the medium air/fuel ratio between the stoichiometric point and the lean point is higher than that in exhaust gas at the lean air/fuel ratio and the stoichiometric air/fuel ratio. Therefore, if the fuel is burned at the medium air/fuel ratio, there is the problem that the concentration of NOx inreases. One disadvantage of the conventional engine control apparatus is that particularly in a large emission vehicle, it become difficult to clear the auto-emission standards of the total emission amount of NOx at a mode operation.

Even if the fuel injection amount is controlled in such a way that the target air/fuel ratio is varied step by step between the stoichiometric point and the lean point not so as to match with the medium air/fuel ratio, there is the cylinder in which the fuel is burned at the medium air/fuel ratio. Therefore, another disadvantage of the conventional engine control apparatus is that the concentration of NOx may become several times to several tens of times more than that in a steady state.

SUMMARY OF THE INVENTION

An object of the present invention is to provide an improved engine control apparatus for a lean-burn engine in which it is possible to minimize the increase of the concentration of NOx when the air/fuel ratio is switched between the stoichiometric point and the lean point during the running of a vehicle.

In the improved engine control apparatus according to the present invention, when the air/fuel ratio is switched from the stoichiometric point to the lean point or from the lean point to the stoichiometric point, the ignition timing is controlled to be delayed by a period of time at which controls pass through the medium air/fuel ratio between the stoichiometric point and the lean point.

According to one aspect of the present invention, an engine control apparatus includes means for detecting a predetermined period of the transient time in which the air/fuel ratio is switched from the stoichiometric point to the lean point or from the lean point to the stoichiometric point, and means for delaying an ignition timing during the predetermined period of transient time.

According to another aspect of the present invention, the delaying means include a table or a map storing delay amount determined by an operation point of an engine speed, torque, etc.

According to a further aspect of the present invention, the detecting means include a working actuator which causes a swirling flow in an engine cylinder.

According to another aspect of the present invention, the means for detecting a predetermined period of the transient time is an O2 sensor or an air/fuel ratio sensor, in which the air/fuel ratio is switched from the stoichiometric point to the lean point or from the lean point to the stoichiometric point.

The lean-burn engine using the engine control apparatus according to the present invention is controlled such that the fuel is burned at a lean air/fuel ratio far higher than the stoichiometric point at a low engine speed or light load, thereby improving the fuel consumption. The fuel is burned at the stoichiometric air/fuel ratio and the vehicle is operated at the target air/fuel ratio, in order to improve the torque performance under acceleration or heavy load.

When it is required to control the combustion by switching the air/fuel ratio from the stoichiometric point to the lean point or from the lean point to the stoichiometric point during the running of a vehicle, the target air/fuel ratio is switched. In fact, the ignition timing of an ignition device is delayed by the predetermined period of time with respect to the normal ignition timing at the lean point or at the stoichiometric point until the target air/fuel ratio becomes the lean point or the stoichiometric point through the medium air/fuel ratio.

Even if the ignition timing is different while the vehicle is operated at the same air/fuel ratio, the more the delay of ignition timing, the lower the NOx concentration of the exhaust gas. Therefore, by controlling to delay the ignition timing, it is possible to switch to the target air/fuel ratio so as to avoid the ignition timing region at which the concentration of NOx of the exhaust gas is high.

BRIEF DESCRIPTION OF THE DRAWINGS

A better understanding of the present invention will be had with reference to the following detailed description when read in conjunction with the drawing. wherein like reference numerals refer to like parts through out the several views.

FIG. 6A is a graph illustrating the relation between the target air/fuel ratio and the actual air/fuel ratio.

FIG. 6B is a graph illustrating the relation in ignition timing between the prior art and the present invention.

FIG. 6C is a graph illustrating the relation in the concentration of NOx between the prior art and the present invention.

FIG. 7 is a table of the delay amount in another embodiment of the present invention.

FIG. 8 is a map of the delay amount in another embodiment of the present invention.

FIG. 9 is a partial flowchart for the delay control of the ignition timing in another embodiment of the present invention. FIG. 10 is another partial flowchart for the delay control of the ignition timing in another embodiment of the present invention.

DESCRIPTION OF THE PREFERRED EMBODIMENTS

An engine control apparatus for lean-burn engines according to the present invention will be explained hereinafter.

Figure 1:
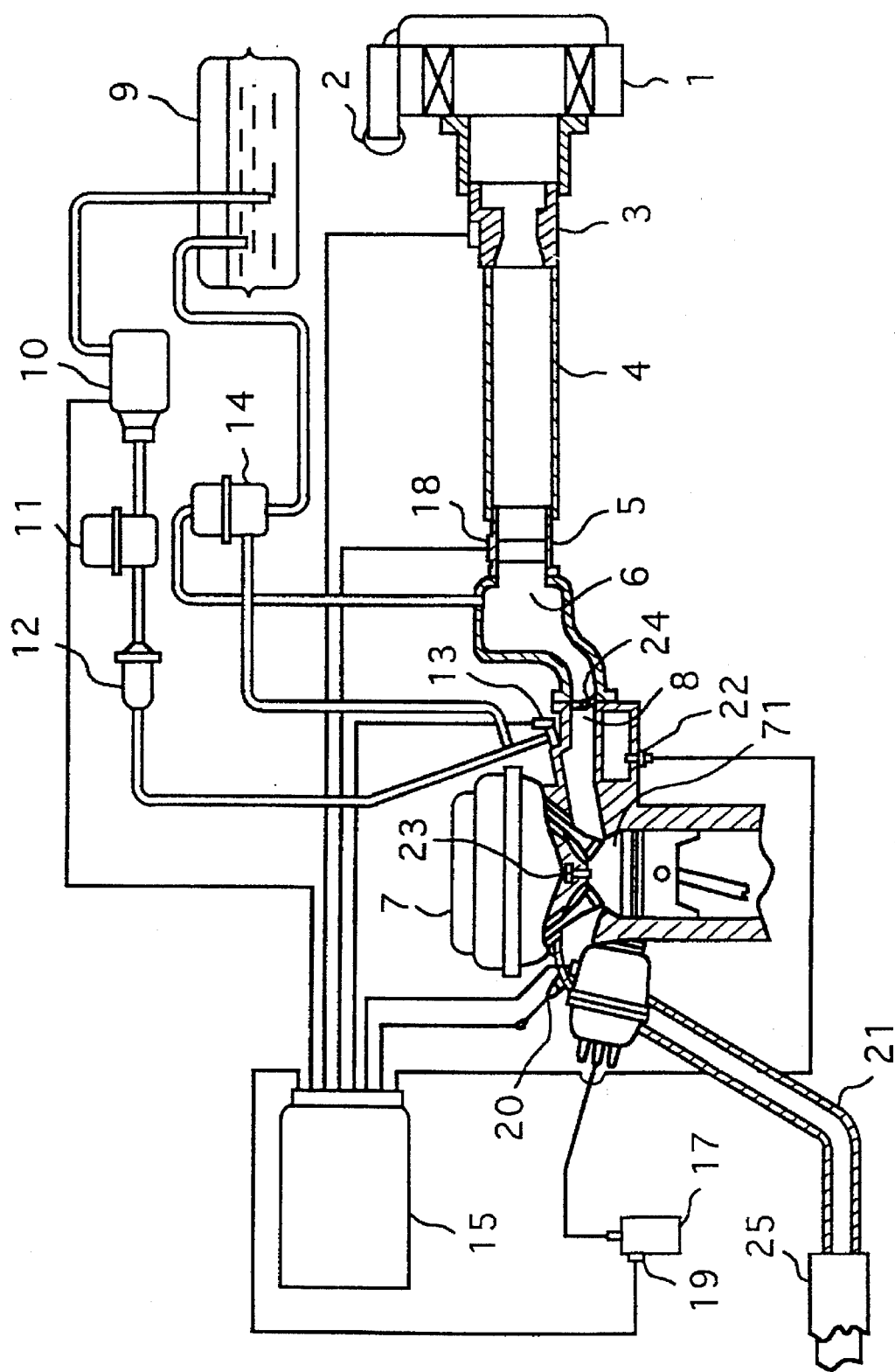
FIG. 1 is a schematic view showing an embodiment of a lean-burn engine using an engine control unit according to the present invention.

FIG. 1 is a schematic view showing an embodiment of a lean-burn engine using an engine control unit according to the present invention.

In an engine apparatus shown in FIG. 1, the intake air intaked from an inlet portion 2 of an air cleaner 1 of the engine apparatus is flowed through an intake duct 4 and a throttle valve body 5 housing a throttle valve for controlling the amount of intake air flow into a collector 6.

The air intaked into the collector 6 is distributed into intake pipes 8 each connected to each of cylinders of an engine 7 and introduced into each cylinder 71 of the engine 7.

While the fuel such as gasoline is sucked from a fuel tank 9 by using a fuel pump 10, and by the application of pressure to the fuel, the fuel is supplied through a fuel dumper 11 and a fuel filter 12 into a fuel injection valve 13 and also a fuel pressure regulator 14 for flowing the fuel back to the fuel tank 9. The fuel supplied through the fuel dumper 11 and the fuel filter 12 is regulated to a constant pressure by the fuel pressure regulator 14 and injected from the fuel injector 13 provided in the intake pipe 8 of the cylinder 71.

Further, an air flow sensor 3 is provided between the air cleaner 1 and the intake duct 4. The air flow sensor 3 detects intake air flow Q, and outputs the detected signal to a control unit 15. The throttle valve body 5 is provided with a throttle sensor 18 for detecting the opening of the throttle valve. An opening signal from the throttle sensor 18 is also inputted to the control unit 15.

Further, a swirling-air producing valve 24 is provided in the intake pipe 8 of the engine 7. The swirling-air producing valve 24 functions as a working actuator which produces the swirling air in the cylinder. An opening signal from the swirling-air generating valve 24 is also inputted to the control unit 15.

The engine 7 is equipped with a distributor 16 including a crank angle sensor. The crank angle sensor outputs a reference position signal REF indicative of a rotation position of the crank shaft, and a position signal POS indicative of the rotation number. These signals are also inputted to the control unit 15.

An ignition control signal from the control unit 15 is supplied to an ignitor 19. The ignition control signal is given as an output of an ignition coil 17 through the distributor 16 to an ignition plug 23. Although the ignition control signal was distributed through the distributor into the ignition plug 23 of the cylinder in the embodiment explained hereinbefore, it should be appreciated that the ignition control signal can be supplied directly from the control unit 15 to each of the ignition coils.

An air/fuel ratio (A/F) sensor 20 for detecting an air/fuel ratio during actual driving of a vehicle is provided in an exhaust pipe 21. An output signal detected by the A/F sensor 20 is also inputted to the control unit 15. The A/F sensor 20 may be a sensor which can detect the air/fuel ratio in the wide range from the stoichiometric point to the lean point, or a sensor which can detect whether the fuel is dense or dilute with respect to the predetermined A/F ratio. A three way catalyst 25 is inserted into the exhaust pipe 21.

Figure 2:
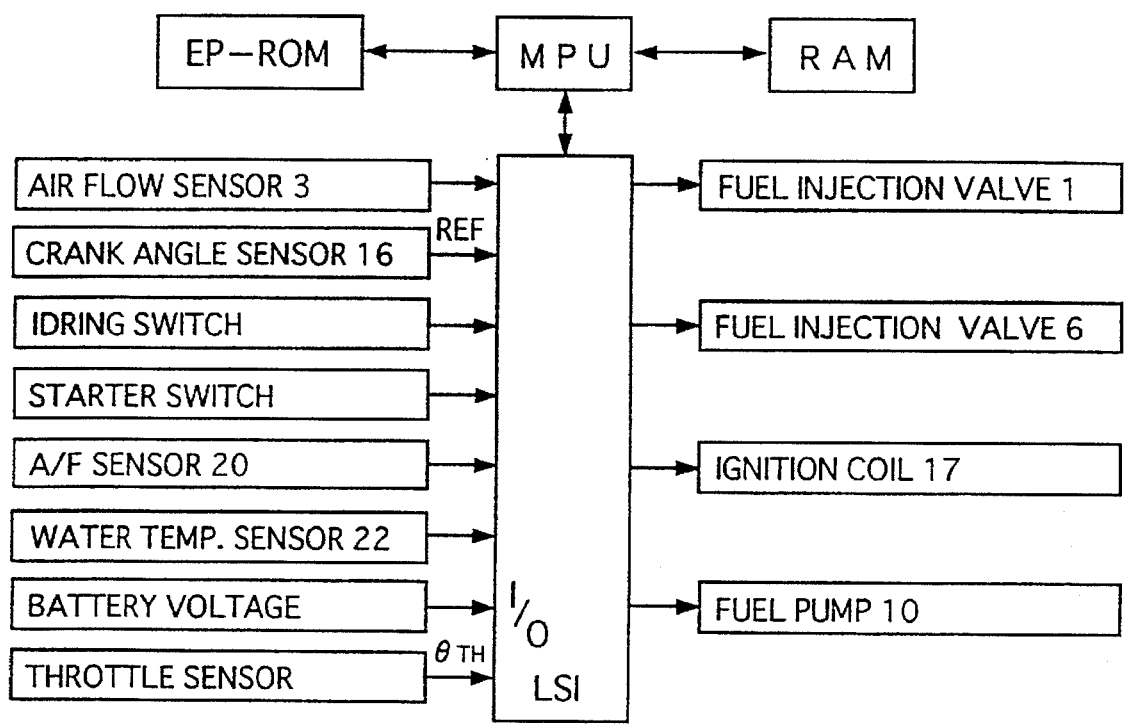
FIG. 2 is a block diagram showing the construction of the engine control unit according to the present invention.

As shown in FIG. 2, a main part of the control unit 15 is comprised of a microcomputer including a MPU, a ROM, a RAM, an A/D converter and so on. The microcomputer inputs the detection signals from a variety of sensors for detecting the operation condition of the engine (for example, the air flow sensor 3, the throttle sensor 18, the crank position sensor 16, the A/F sensor and a water temperature sensor 22), converts the signal by the A/D converter and carries out the predetermined operational processing. As the result of the calculation, the microcomputer outputs a variety of control signals and supplies them to the fuel injector valve or injector 13, the ignition coil 17 and the fuel pump 10 in order to perform the control of the fuel supply amount and the control of the ignition timing.

Figure 5:
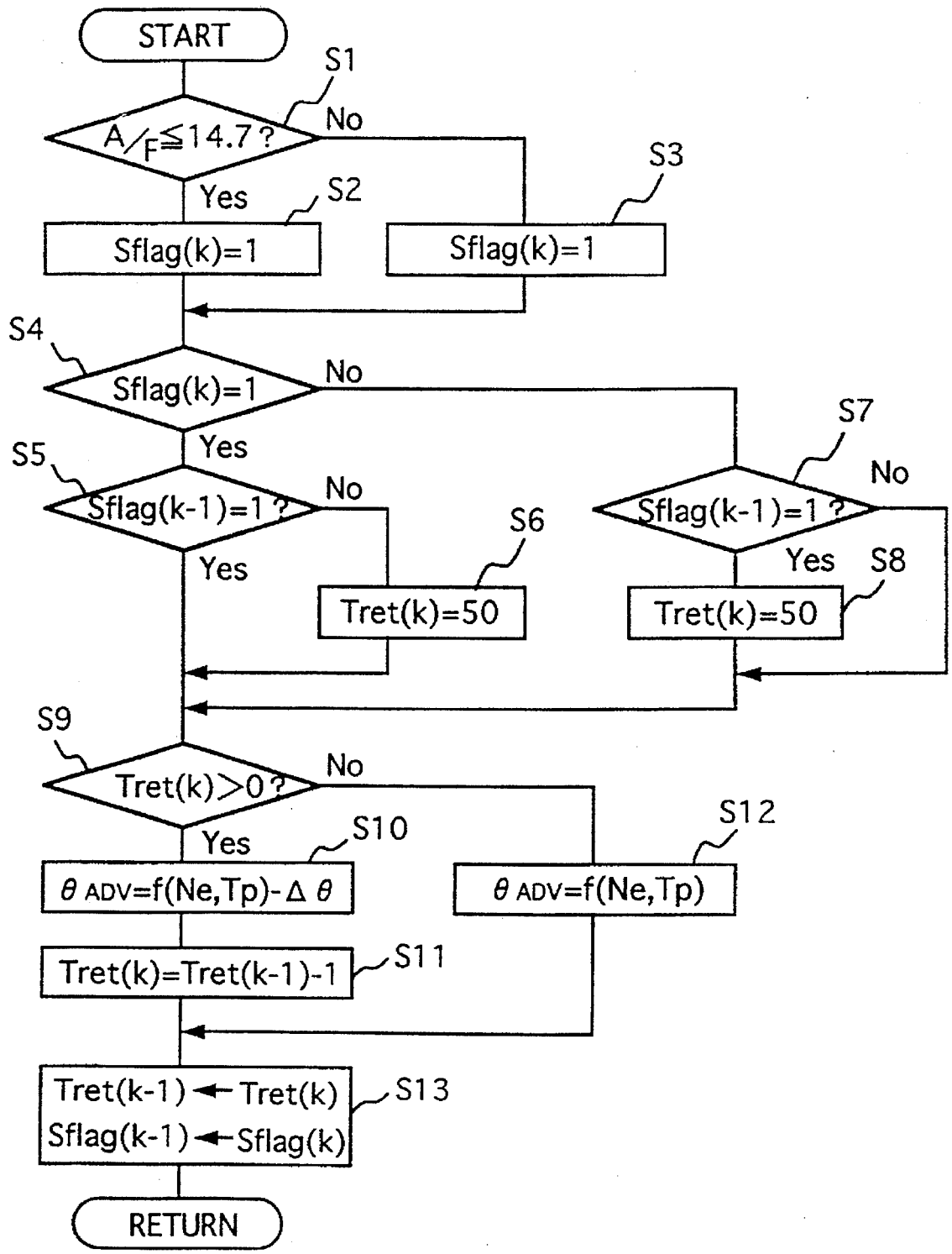
FIG. 5 is a flow chart illustrating the delay control of the ignition timing in the engine control unit according to the present invention.

In an example of the present invention, the microcomputer carries out arithmetic processing along the program stored in the ROM and shown in the flow chart of FIG. 5.

Figure 3:
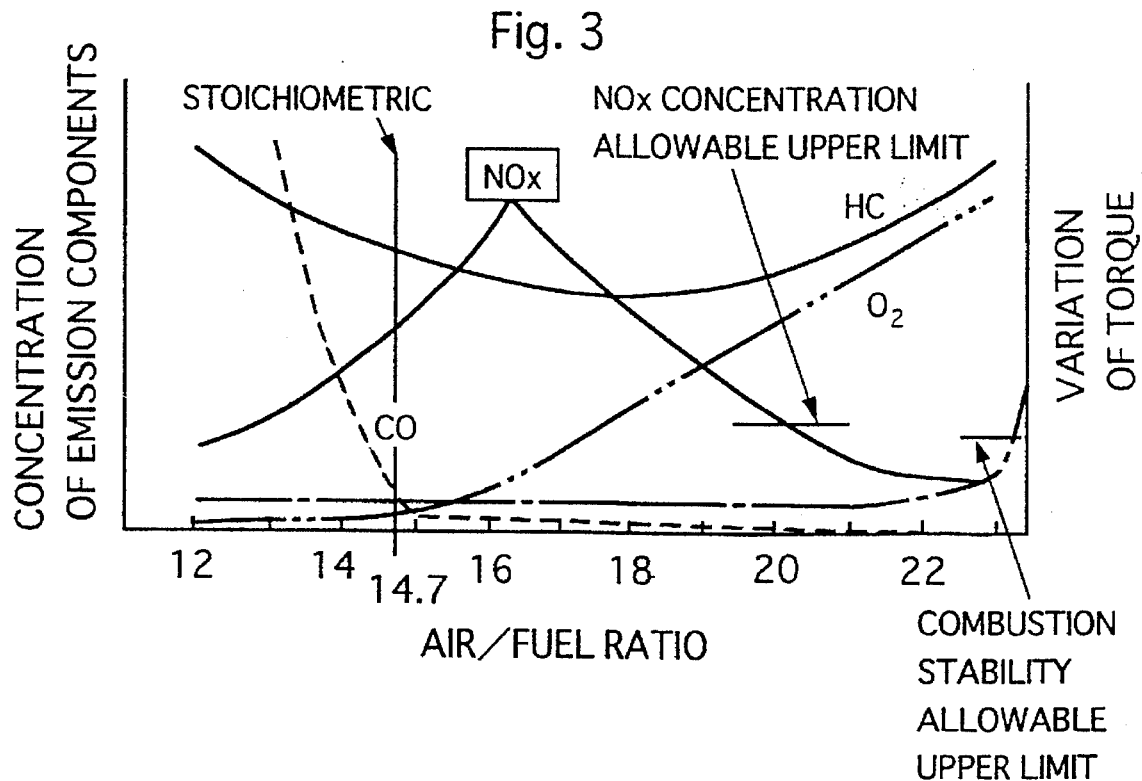
FIG. 3 is a graph illustrating the relation between the concentration of components in the exhaust gas and an air/fuel ratio, and the relation between the variation of torque and the air/fuel ratio.

The relation between the variation of the torque and the concentration of the combustion emission components with respect to the air/fuel ratio of the intaked air mixture has the characteristics shown in FIG. 3.

The following fact can be found from FIG. 3. If the A/F ratio is increased so as to become lean while maintaining the torque and the engine speed constant, then the intake air amount is increased, thus a fuel consumption factor is improved and the fuel consumption is decreased. Further, because the combustion temperature becomes lower with the lean A/F ratio, the concentration of the NOx emission is reduced. The combustion stability can be known determinately on the basis of the variation of the torque. The torque variation or combustion stability deteriorates slowly to the extent of a certain lean air/fuel ratio. When it exceeds the lean A/F value, the sparking ability becomes extremely low and the combustion stability deteriorates suddenly.

It can be understood from the above explanation that the combustion stability and the concentration of the NOx emission depend largely on the air/fuel ratio.

Figure 4:
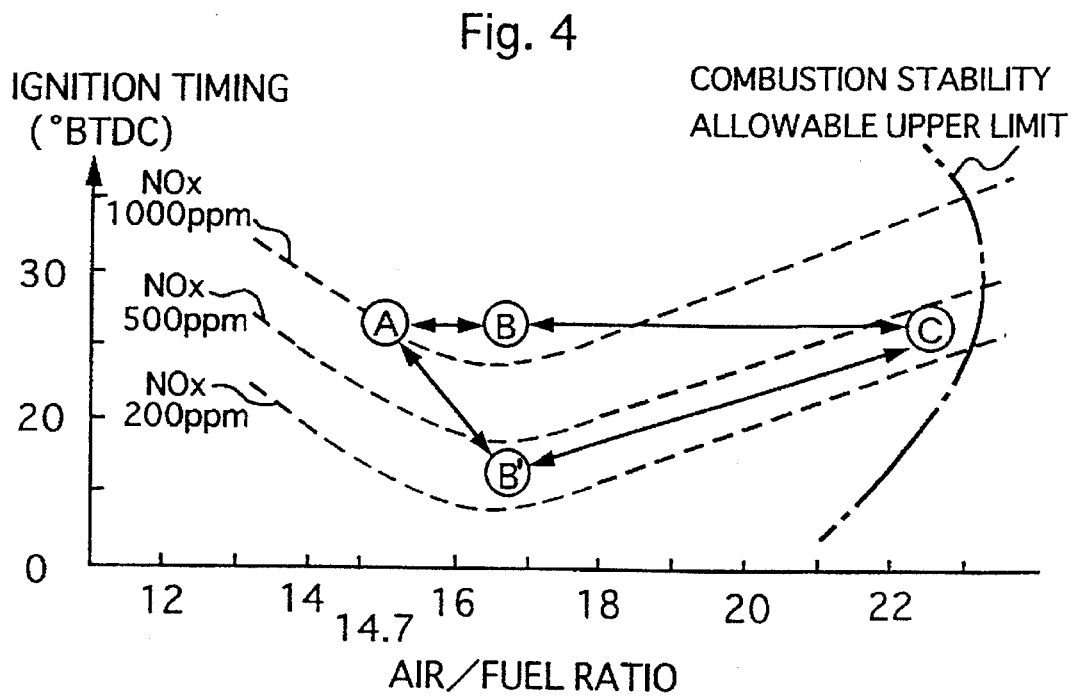
FIG. 4 is a graph illustrating the relation between the ignition timing and the air/fuel ratio, with respect to the NOx concentration.

With reference now to FIG. 4, there is shown the relation between the air/fuel ratio and the ignition timing and the concentration of the NOx emission. When the air/fuel raio is constant, the later the ignition timing, the lower the concentration of the NOx emission. When ignition timing is constant, the air/fuel ratio has the maximum value between A/F=16 to 17 which are higher than the stoichiometric A/F ratio (14.7) in any A/F ratios.

Therefore, if the engine is operated at a lean point, the operating point should be set to a point (C) at which the A/F ratio is lower than the limit of the combustion stability and the amount of the NOx emission is small.

Further, in the example of FIG. 4, the concentration of NOx is high at a stoichiometric point (A). However, in the (A) point, the concentration of O2 emission is low and that of HC, CO and NOx emission are as shown in FIG. 3. Because NOx can be removed efficiently by using a three way catalyst, there is no problem in the operation at the stoichiometric point (A).

However, in the medium air/fuel ratio, a (B) point, not only the concentration of NOx emission is high, but also that of O2 emission is high. When the concentration of O2 emission is high like this, NOx can not be removed effectively by the three way catalyst.

As described hereinbefore, when the target A/F ratio is switched from the stoichiometric point to the lean point in the combustion control of the conventional lean-burn engine, the ignition timing of the engine is not changed. Therefore, the lean target A/F ratio, the (C) point is obtained only by way of the medium A/F ratio from the stoichiometric target A/F ratio. When passing the medium A/F ratio, the concentration of NOx in the exhaust gas is high and the concentration of the O2 emission is also high at that point. Accordingly, it was impossible to reduce the concentration of the NOx emission even by using any three way catalysts.

However, when the target A/F ratio is switched from the stoichiometric target A/F ratio, the (A) point to the lean target A/F ratio (C), if the combustion of the engine is controlled so as to pass through the medium A/F ratio at a (B') point as shown in FIG. 4, the NOx concentration of the exhaust gas in the medium A/F ratio at the (B') point is lower than that in the medium A/F ratio at the (B) point. the NOx concentration at that point is almost the same as that in the lean target A/F ratio at the (C) point. This means that even if the combustion is controlled such that the target A/F ratio may be switched from the stoichiometric target A/F ratio at the (A) point to the lean target A/F ratio at the (C) point, and the target A/F ratio passes through the medium A/F ratio region during its switching operation, thereby the concentration of NOx in the exhaust gas can never be increased.

Similar comments can apply to the case that the target A/F ratio is switched from the lean target A/F ratio at the (C) point to the stoichiometric target A/F ratio at the (A) point.

In the combustion control of the engine, to allow an A/F ratio to pass through the medium A/F ratio at the (B') point means to control so as to delay the ignition timing. Therefore, the amount of the NOx emission can be reduced by allowing the A/F ratio to pass through the medium A/F ratio at the (B') point.

Next, referring to FIG. 5. a flowchart is thereshown for illustrating the delay control of the ignition timing in the engine control unit according to the present invention.

The main program for the fuel injection control is run every time a reference angle signal REF indicative of the reference of the fuel injection control is outputted from the crank angle sensor 16. The fuel injection is performed for the cylinder in the next stroke every the reference angle signal REF on the basis of this program.

The program for the ignition control is run every time when the reference angle signal REF and a cylinder signal are outputted. The ignition at each of cylinders is performed when an energizing signal and a cut-off signal are supplied to an ignition plug 23 at the predetermined angle.

The processing from START in the flow chart of FIG. 5 to RETURN is executed as the periodic interruption processing. In this embodiment, this interruption processing is executed every 10 ms.

In step S1, it is determined whether or not the A/F ratio of the engine is at the stoichiometric A/F ratio. If the A/F ratio is at the stoichiometric state, then the processing advances to step S2 and S=1 flag indicative of the stoichiometric state is set. Otherwise, the processing branches to step S3 and S=0 flag indicative of the lean state is set.

Next, in step S4, it is determined whether the stoichiometric or the lean A/F ratio determined step S1 is now switching between the stoichiometric point and the lean point. In step S4, it is determined whether or not the A/F ratio of this time is at the stoichiometric point. If so, it is determined whether or not the last A/F ratio was at the stoichiometric point. If it was determined in step S5 that the A/F ratio of last time was not at the stoichiometric point, then step S5 branches to step S6, because the A/F ratio of last time is at the lean point and that of this time is at the stoichiometric point. In step S6, a subtraction timer Tret is set to "50". If the A/F ratio of last time is also at the stoichiometric point, then the subtraction timer is not set and the processing advances to step S9, because the target A/F ratio of this time is at the same stoichiometric point as that of last time.

While, If the A/F ratio of this time is not at the stoichiometric point in step S4, then step S4 branches to step S7 and it is determined whether or not the A/F ratio of last time was at the stoichiometric point. If the A/F ratio of last time is at the stoichiometric point and that of this time is at the lean point, then the processing advances to step S8 and the subtraction timer is set to "50". If in step S7, it was determined that the A/F ratio of last time is not at the stoichiometric point, then the subtraction timer is not set and the processing returns to step S9, because the target A/F ratio of this time is at the same stoichiometric point as that of last time.

If the subtraction timer was set in steps S6 and S7, the value of the subtraction timer begins to decrease. While the value of the subtraction timer is larger than "0", the ignition control for delaying the ignition timing is performed.

In step S9, it is determined whether or not the value Tret(k) of the subtraction timer is larger than "0". If the value Tret(k) of the subtraction timer is equal to "0", then step S9 branches to step S12 and the ignition timing is not delayed and controlled in accordance with the value stored in a map in which the ignition control values at a steady state are written. In this case, the ignition timing is set to θADV which is determined on the basis of an engine speed Ne and an engine load Tp.

In step S9, if the value Tret(k) is larger than "0", then the processing advances to step 10 and the ignition timing θADV is delayed by Δθ from the value obtained from the map. The processing that the value Tret(k) of the subtraction timer is subtracted by "1" is carried out in step S11. Because the value Tret(k) of the subtraction timer is decreased from "50" to "0" in this embodiment of the present invention, the ignition timing is delayed 500 ms.

Finally, the value Tret(k−1) of the subtraction timer and the value Sflag(k−1) of the stoichiometric point are renewed, and it is ready for next processing.

As described above, when the stoichiometric point and the lean point are switched in the engine combustion control, the control of the ignition timing is performed on the basis of the flow chart shown in FIG. 5. At this time, the air/fuel ratio, the ignition timing and the concentration of NOx varies as shown in FIGS. 6A, 6B and 6C, respectively.

In FIG. 6A, the target A/F ratio is switched from the stoichiometric point to the lean point, and then switched again to the stoichiometric point. The target A/F ratio is switched from the stoichiometric point to the lean point at the time a. However, because the target A/F ratio passes through the medium A/F ratio, the actual A/F ratio becomes equal to the target A/F ratio at the time b. Between the times a and b, the actual A/F is equal to the medium A/F ratio. If the control of the ignition timing is not performed, the concentration of NOx may be increased as shown in FIG. 6C. Similar comments apply to the case that the target A/F ratio is switched from the lean point to the stoichiometric point between the time c and the time d.

If the ignition timing is delayed between the times a and b and between the times c and d as shown in FIG. 6B when the target A/F ratio is switched by controlling the ignition timing in the engine control, it is possible to suppress the concentration of NOx as shown at the dotted line of FIG. 6C. To delay the ignition timing between the times a and b and between the times c and d means that the target A/F ratio pass throuth the (B') point in the medium air/fuel ratio region in FIG. 4 when switched. Therefore, it is possible to reduce the concentration of NOx in the exhaust gas.

One example of the control of ignition timing in a lean-burn engine according to the present invention has been explained hereinbefore. However, many modifications thereto will become apparent to those skilled in the art to which it pertains without deviation from the spirit of the invention as defined by the scope of the appended claims.

Although in the above embodiment of the present invention, the control of the ignition timing is performed along the flow chart shown in FIG. 5, wherein the stoichiometric point is detected by using an air/fuel ratio sensor and the delay time of the ignition timing is determined by using the subtraction timer, it is appreciated that the control of the ignition timing can be performed in the following way.

(a) Although in step S5 of the program of FIG. 5, the delay amount $\Delta\theta$ of the ignition timing is constant when the target A/F ratio is switched between the stoichiometric point and the lean point, it is desirable that the delay amount $\Delta\theta$ of the ignition timing corresponding to the engine speed and the torque is stored in advance as a map or a table, and the control of the ignition timing is performed by changing the delay amount $\Delta\theta$ on the basis of the map or the table, because the optimum delay amount of the ignition timing exists for the engine speed and the torque at each time point during engine operation.

FIG. 7 is a table of the delay amount $\Delta\theta$ of the ignition timing, and FIG. 8 is a map of the delay amount thereof. FIGS. 9 and 10 are partial flow charts for the delay control of the ignition timing, which also show the processing of the map or table of the delay amount $\Delta\theta$ of the ignition timing.

In the processing due to the table shown in FIGS. 7 and 9, the delaly amount $\Delta\theta$ of the ignition timing is determined by using one parameter, the engine speed. While, in the processing due to the map in FIGS. 8 and 10, the delay amount $\Delta\theta$ of the ignition timing is determined by using two parameters, the engine speed and the throttle opening.

The partial flow chart showing a part of processing of the control of the ignition timing in FIGS. 9 and 10 may be inserted between step 9 and step 10 or just after START of the flow chart for the control of the ignition timing in FIG. 5.

In step S14 of the partial flow chart of FIG. 9, the current engine speed Ne is read in, the table is retrieved on the basis of the engine speed read in step S15, the interpolation is performed and the delay amount $\Delta\theta$ of the ignition timing is determined. While, in step 16 of the partial flow chart of FIG. 10, the current engine Ne and the current torque Th are read in, the map is retrieved on the basis of the engine speed Ne and the torque Th read in step S17, the interpolation is performed and the delay amount $\Delta\theta$ of the ignition timing is determined. Finally, in step S10, the ignition timing $\theta$ADV is delayed by the value $\Delta\theta$ obtained from the map on the basis of the determination of the delay amount $\Delta\theta$ of the ignition timing, and then the ignition is performed.

(b) The swirling-air producing valve 24 which configures the working actuator positioned in the intake pipe 8 of each cylinder 71 of the engine 7 shown in FIG. 1 is at an open position $\theta$OPEN when the target A/F ratio of the engine is at the stoichiometric point. The swirling-air producing valve 24 is at a closed position $\theta$CLOSE when the target A/F ratio is at the lean point. As a result, the intake air which passes through the swirling-air producing valve 24 is supplied into the cylinder 71, and the swirling-air can be produced. When the target A/F ratio is switched between the stoichiometric point and the lean point, the swirling-air producing valve 24 is shifted from an open position to a closed position or from the closed position to the open position. The target A/F ratio takes the medium A/F ratio during this shifting. It is possible to delay the ignition timing of an engine by regarding the medium position of the opening of the swirling-air producing valve 24 as the medium A/F ratio region and determining the delay timing.

Figure 11A:
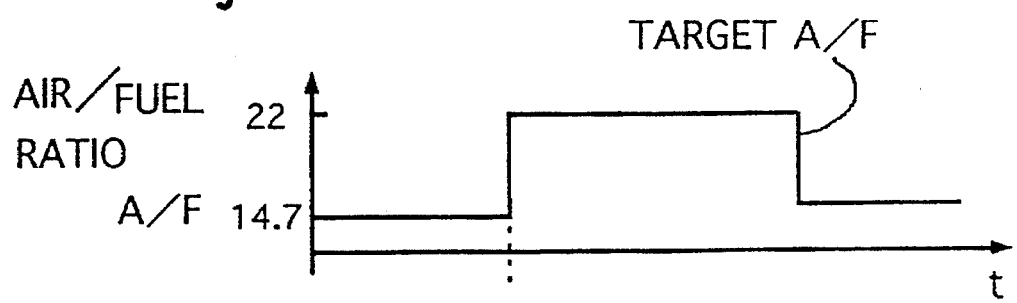
FIG. 11 is a graph illustrating the relation between the air/fuel ratio and the opening of the swirling-air producing valve and the ignition timing (delay timing) in another embodiment of the present invention.
Figure 11B:
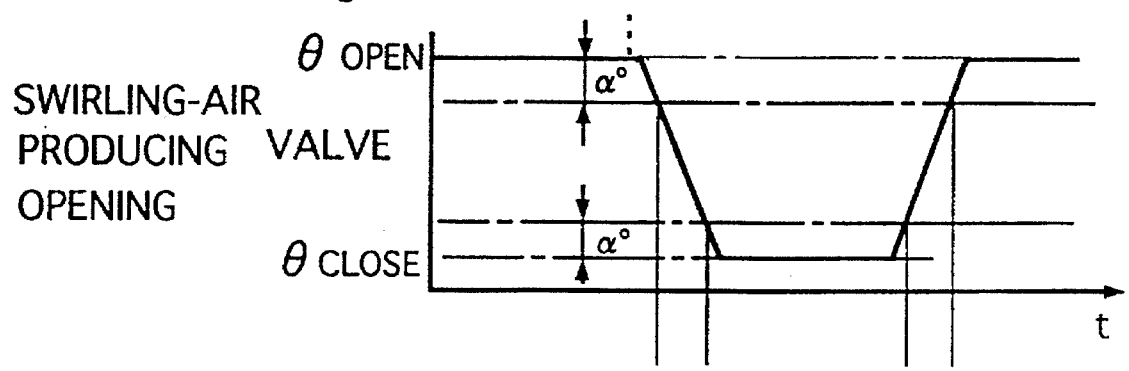
Figure 11C:
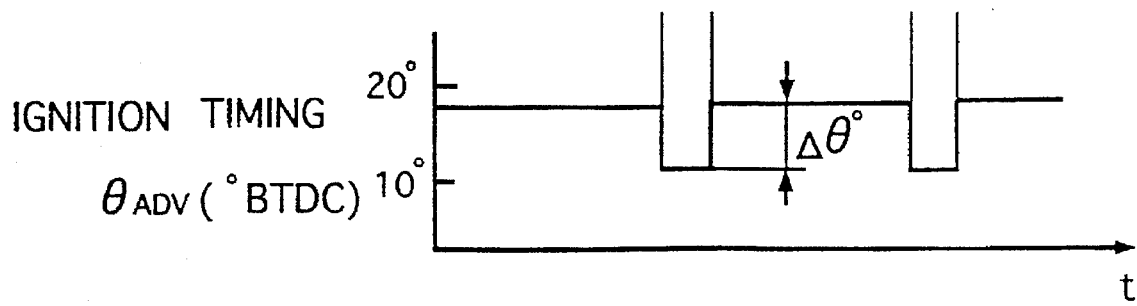

FIG. 11 is a graph illustrating the relation between the air/fuel ratio and the opening of the swirling-air producing valve and the ignition timing (delay timing). The swirling-air producing valve is opened or closed when the target A/F ratio is switched. In this embodiment, by regarding the appropriate angle position (+$\alpha$°, −$\alpha$°) between the open position $\theta$OPEN and the closed position $\theta$CLOSE as the beginning or the end of the delay, the delay angle $\Delta\theta$ of the ignition timing is determined within the range of the open position and the closed position between the appropriate positions.

Figure 12:
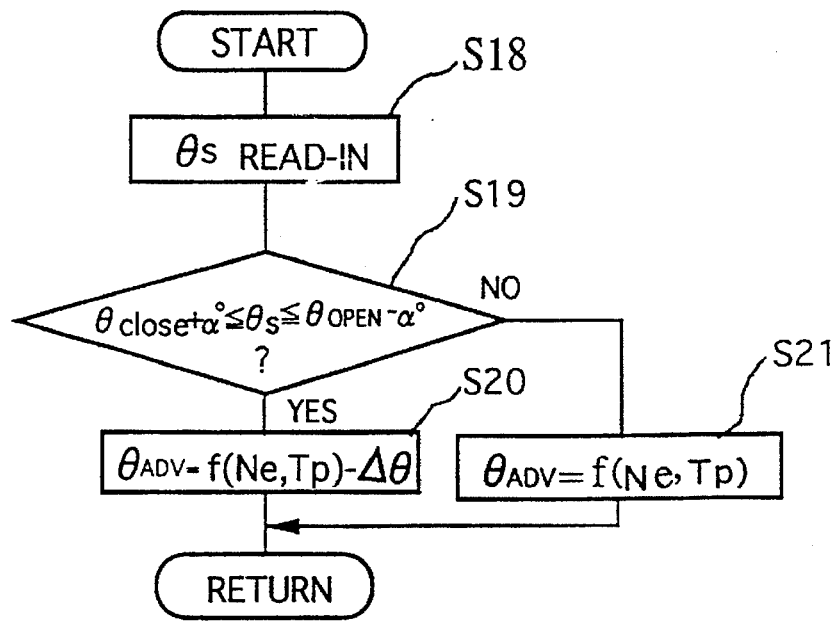
FIG. 12 is a flowchart illustrating the delay control of the ignition timing in the engine control unit according to another embodiment of the present invention.

FIG. 12 is a flowchart illustrating the delay control of the ignition timing in the engine control unit, in which the delay timing is determined on the basis of the closing and opening of the swirling-air producing valve. In step S18, the opening $\theta$S of the swirling-air producing valve is read in. In step S19, it is determined whether or not the read opening $\theta$S is within the appropriate angle positions (+$\alpha$°, −$\alpha$°) between the open position $\theta$OPEN and the closed position $\theta$CLOSE. If the read opening is within the appropriate angle positions (+$\alpha$°, −$\alpha$°) between the open position $\theta$OPEN and the closed position $\theta$CLOSE, then the processing advances to step S20 and the ignition timing is delayed by the delay amount $\Delta\theta$ from a normal state. If the read opening is not within the appropriate angle positions (+α°, −α°) between the open position θOPEN and the closed position θCLOSE, then the processing advances to step 21 and the ignition is performed at a normal ignition timing.

(c) Although in step S1 of the flow chart shown in FIG. 5, it is determined only whether or not the A/F ratio of an engine is at the stoichiometric point by the A/F sensor 20, it is possible to determine the delay amount of the ignition timing by detecting the A/F ratio every moment during the operation of the engine, and determining whether or not the detected A/F ratio is within the range of the medium A/F ratio (16≦A/F≦20) between the stoichiometric point of the target A/F ratio and the lean point thereof.

Figure 13A:
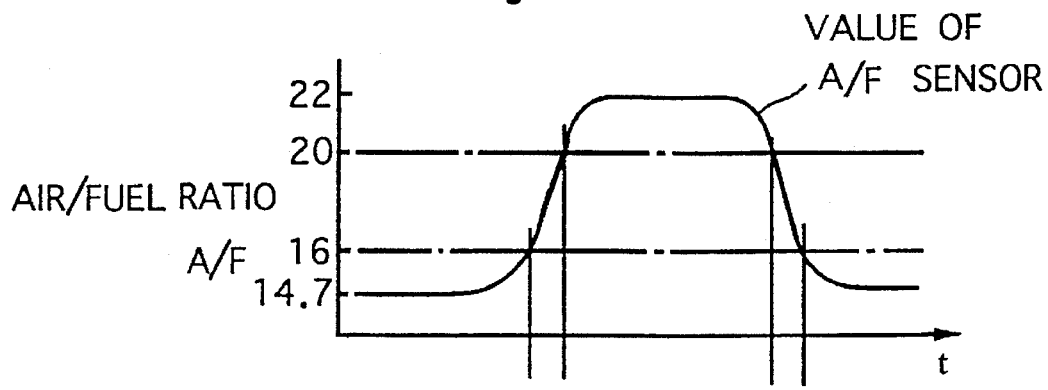
FIG. 13 is a graph illustrating the relation between an air/fuel ratio and an ignition timing in another embodiment of the present invention.
Figure 13B:
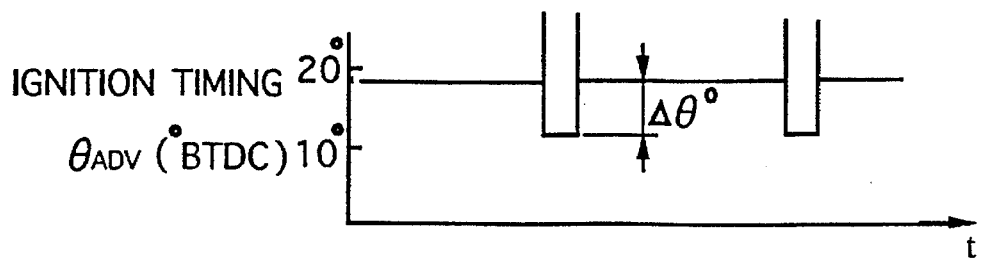
Figure 14:
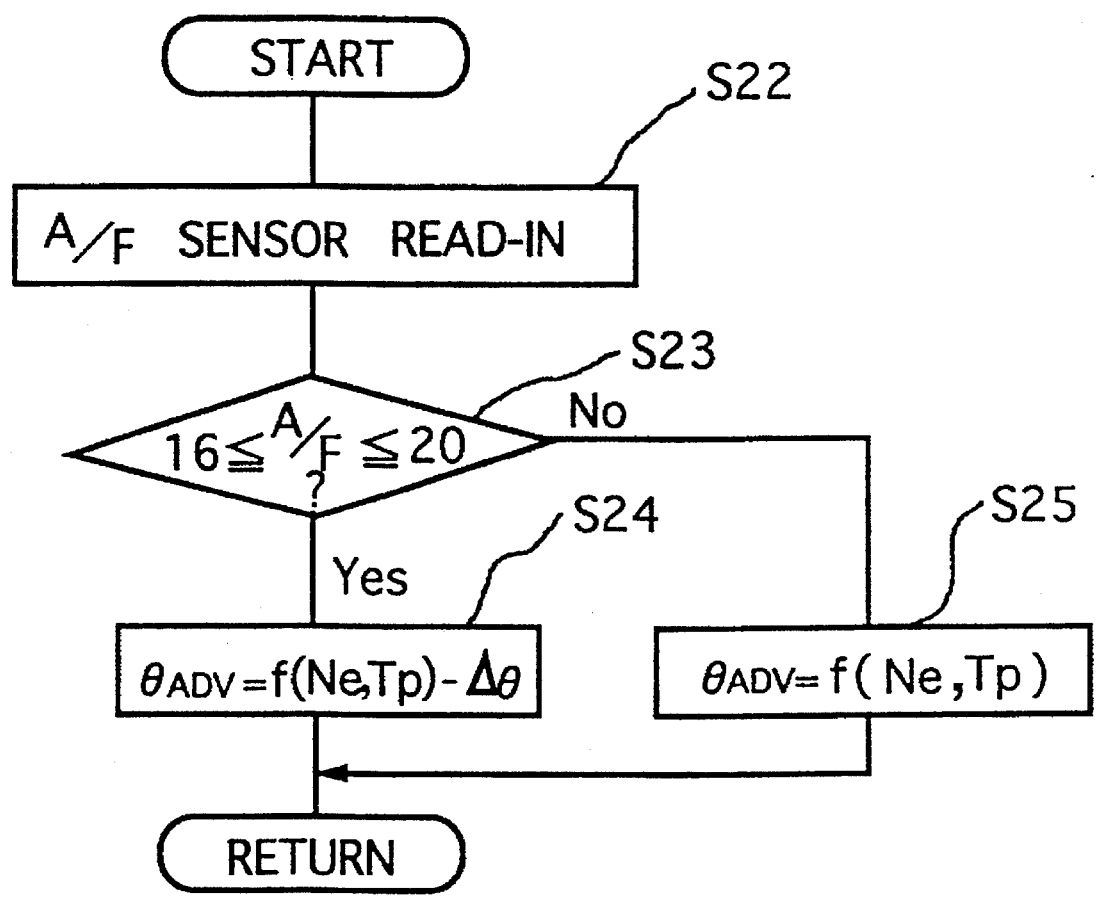
FIG. 14 is a flowchart illustrating the delay control of the ignition timing in the engine control unit according to another embodiment of the present invention.

FIG. 13 is a graph illustrating the relation between the air/fuel ratio and the ignition timing every moment, wherein if the detected A/F ratio is within the range of the medium A/F ratio (16≦A/F≦20), then the ignition timing of the engine is delayed by the delay amount FIG. 14 is a flow chart illustrating the delay control of the ignition timing in the engine control unit, wherein the delay amount of the ignition timing is determined on the basis of the A/F ratio every moment during the operation of the engine. In step S22 of this flow chart, the A/F ratio of the engine is read in every moment. Then, in step S23, it is determined whether or not the detected A/F ratio is within the range of the medium A/F ratio (16≦A/F≦20). If the read A/F ratio is within the range of the medium A/F ratio (16≦A/F≦20), then the processing advances to step S24 and the ignition timing of the engine is delayed by the delay amount Δθ from the normal state. Otherwise, the processing advances to step S25 and the ignition is performed at the normal ignition timing.

(d) Although in the first embodiment of the present invention, the A/F ratio of the engine is determined by the A/F sensor 20 as shown in FIG. 1, it is possible to use an O2 sensor, instead of the A/F sensor. The O2 sensor is used for detecting during the operation of the engine whether the A/F ratio is richer or leaner than the stoichiometric air/fuel ratio. The O2 sensor is used as a sensor for determining whether or not the A/F ratio is at the stoichiometric point in step S1 of FIG. 5, instead of the A/F sensor.

We claim:

1. An engine control apparatus in which an air/fuel ratio for the engine is controlled between the stoichiometric point and a lean point, which comprises means for detecting a predetermined period of the transient time in which the air/fuel ratio is switched from the stoichiometric point to the lean point or from the lean point to the stoichiometric point, and means for delaying an ignition timing during the predetermined period of the transient time.

2. An engine control apparatus according to claim 1, herein said delaying means include a table or a map storing delay amount determined by an operation point of an engine operational parameter comprising speed, torque, load and throttle opening.

3. An engine control apparatus according to claim 1, wherein said detecting means include a working actuator which causes a swirling flow in an engine cylinder.

4. An engine control apparatus according to claim 3, wherein said delaying means delay the ignition timing during the shift of the working actuator beween the stoichiometric point and a lean point.

5. An engine control apparatus according to claim 1, said means for detecting a predetermined period of the transient time is an O2 sensor, in which the air/fuel ratio is switched from the stoichiometric point to the lean point or from the lean point to the stoichiometric point.

6. An engine control apparatus according to claim 1, said means for detecting a predetermined period of time of a transient state is an air/fuel ratio sensor, in which the air/fuel ratio is switched from the stoichiometric point to the lean point or from the lean point to the stoichiometric point.

7. An engine control apparatus according to claim 6, said air/fuel ratio sensor is such a sensor that can detect the air/fuel ratio in the range between the stoichiometric point and the lean point.

8. An engine control apparatus according to claim 7, wherein said means for delaying the ignition timing delay the firing timing while the detected air/fuel ratio has a medium value between predetermined values.

9. An engine control apparatus according to claim 2, wherein said detecting means include a working actuator which causes a swirling flow in an engine cylinder.

10. An engine control apparatus according to claim 9, wherein said delaying means delay the ignition timing during the shift of the working actuator between the stoichiometric point and a lean point.

11. An engine control apparatus according to claim 2, said means for detecting a predetermined period of the transient time is an O2 sensor, in which the air/fuel ratio is switched from the stoichiometric point to the lean point or from the lean point to the stoichiometric point.

12. An engine control apparatus according to claim 2, said means for detecting a predetermined period of time of a transient state is an air/fuel ratio sensor, in which the air/fuel ratio is switched from the stoichiometric point to the lean point or from the lean point to the stoichiometric point.

13. An engine control apparatus according to claim 12, said air/fuel ratio sensor is such a sensor that can detect the air/fuel ratio in the range between the stoichiometric point and the lean point.

14. An engine control apparatus according to claim 13, wherein said means for delaying the ignition timing delay the firing timing while the detected air/fuel ratio has a medium value between the predetermined values.

15. An engine control apparatus according to claim 1, wherein said delaying means include a map for storing a delay amount determined by an operation point of one of the relationship between an engine speed and torque, between an engine speed and a load-indicative value, and between an engine speed and throttle opening.

16. A method for controlling an air/fuel ratio of an engine between the stoichiometric point and a lean point comprising the steps of (a) detecting a predetermined period of transient time in which the air fuel ratio is switched between the stoichiometric point to the lean point, and (b) delaying an ignition timing during the predetermined period.

* * * * *